US008683004B2

(12) United States Patent
Bauer

(10) Patent No.: US 8,683,004 B2
(45) Date of Patent: Mar. 25, 2014

(54) APPARATUS FOR CONTROLLING A MACHINE

(75) Inventor: Klaus Bauer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 950 days.

(21) Appl. No.: 12/648,743

(22) Filed: Dec. 29, 2009

(65) Prior Publication Data
US 2010/0154051 A1 Jun. 17, 2010

Related U.S. Application Data

(63) Continuation of application No. PCT/DE2008/001044, filed on Jun. 21, 2008.

(30) Foreign Application Priority Data

Jun. 29, 2007 (DE) .................. 10 2007 030 396

(51) Int. Cl.
G06F 15/16 (2006.01)
G06F 15/173 (2006.01)
G06F 12/10 (2006.01)
G06F 21/00 (2013.01)

(52) U.S. Cl.
USPC .......... 709/217; 709/223; 709/224; 709/225; 709/226; 709/227; 709/203; 726/15; 718/102; 718/1; 718/100; 718/106

(58) Field of Classification Search
USPC .......................... 709/227, 217, 223
See application file for complete search history.

(56) References Cited

U.S. PATENT DOCUMENTS

| | | | | |
|---|---|---|---|---|
| 6,612,004 B2 * | 9/2003 | Yamazaki et al. | ............ | 29/27 C |
| 6,788,980 B1 | 9/2004 | Johnson | | |
| 7,529,916 B2 * | 5/2009 | Kershaw et al. | ............... | 712/229 |
| 7,675,921 B2 * | 3/2010 | Igarashi | ................... | 370/395.53 |
| 7,971,010 B2 * | 6/2011 | Schmelter et al. | ............ | 711/159 |
| RE42,579 E * | 7/2011 | Bhaskar et al. | ................ | 717/109 |
| 8,104,034 B2 * | 1/2012 | Drepper | ............................ | 718/1 |
| 8,201,732 B1 * | 6/2012 | Kropf et al. | .................... | 235/379 |

(Continued)

FOREIGN PATENT DOCUMENTS

CN 1449524 A 10/2003
DE 10212151 1/2004

(Continued)

OTHER PUBLICATIONS

Authors: Samuel T. King, George W. Dunlap, Peter M. Chen, Title: Operating System Support for Virtual Machines; Date: Proceedings of the 2003 USENIX Technical Conference, Publisher: Computer Science and Engineering Division Department of Electrical Engineering and Computer Science University of Michigan; http://www.eecs.umich.edu/CoVirt; pp. 1-14.*

(Continued)

*Primary Examiner* — Jude Jean Gilles
(74) *Attorney, Agent, or Firm* — Fish & Richardson P.C.

(57) ABSTRACT

An apparatus for controlling a machine includes a machine-sided control computer. The machine-sided control computer includes computer readable media on which a virtual computer is stored, and the virtual computer includes one or more computer programs selected from the group consisting of a machine operating computer program, a communication network connection computer program, and a communication network encryption computer program.

11 Claims, 4 Drawing Sheets

(56) References Cited

U.S. PATENT DOCUMENTS

| | | |
|---|---|---|
| 8,522,330 B2 * | 8/2013 | Shuster et al. .................. 726/7 |
| 2002/0179581 A1 * | 12/2002 | Inoue et al. ............. 219/121.73 |
| 2003/0040811 A1 | 2/2003 | Lim et al. |
| 2005/0187652 A1 * | 8/2005 | Yamazaki et al. ............ 700/182 |
| 2007/0201489 A1 * | 8/2007 | Igarashi .................. 370/395.53 |
| 2007/0204166 A1 * | 8/2007 | Tome et al. .................. 713/182 |
| 2008/0091794 A1 | 4/2008 | Thieringer |
| 2008/0183996 A1 * | 7/2008 | Field et al. .................... 711/163 |

FOREIGN PATENT DOCUMENTS

| | | |
|---|---|---|
| DE | 10212151 A1 | 1/2004 |
| DE | 102005015919 | 10/2005 |
| DE | 202006010189 | 9/2006 |
| EP | 1327938 A1 | 8/2001 |
| EP | 1248169 | 8/2004 |
| EP | 1715395 | 10/2006 |
| EP | 1715395 A1 | 10/2006 |
| WO | WO2006111376 A1 | 10/2006 |

OTHER PUBLICATIONS

Notification of Transmittal of Translation of the International Preliminary Report on Patentability and Written Opinion for corresponding PCT Application No. PCT/DE2008/001044, mailed Jan. 28, 2010, 26 pages.

Chinese Article from Yibeisi studio (D3), Shanghai Scientific & Technical Publishers, published Apr. 30, 2004, pp. 97-105.

3rd Office Action from corresponding Chinese Application No. 200880022839.8, issued Oct. 18, 2012, including English translation of the office action and description of Chinese article D3 on pp. 4 and 5.

IBM White Paper Intel® vPro™ Technology: Built-In Manageability and Proactive Security for Business Desktops PCs; published 2006.

IBM Systems, Virtualization, Version 2, Release 1, published 2005.

Smith et al., "Reading Rehearsal of Virtual Machines: platforms for systems and processes", Morgan Kaufmann Publishers; published 2005.

* cited by examiner

APPARATUS FOR CONTROLLING A MACHINE

CROSS REFERENCE OF RELATED APPLICATIONS

This application is a continuation of and claims priority under 35 U.S.C. §120 to PCT/DE2008/001044, filed on Jun. 21, 2008, and designating the U.S., which claims priority under 35 U.S.C. §119 to German Patent Application No. 10 2007 030 396.5, filed on Jun. 29, 2007. The contents of both the prior applications are hereby incorporated by reference in their entirety.

TECHNICAL FIELD

This disclosure relates to an apparatus for controlling a machine, in which the apparatus includes a machine-sided control computer and a system for remotely communicating between a service computer or service portal and the machine.

BACKGROUND

In general, a control computer for a machine may be, for example, an operating computer that is separate from the machine or integrated as part of the machine itself (e.g., using programmable logic controllers and/or numerical control (NC)). The PLC can be responsible for controlling sensors and/or actuators in the machine that are used in a machining process. Sensors can detect, e.g., the distance of a laser head to the metal to be machined, the laser power, or punch pressure, whereas the actuators are controlled, e.g., to keep a constant distance between laser head and metal or constant laser power. The NC interprets an NC program to drive the machine's axes (e.g., laser axes or axes associated with a work product holder) with precise paths, speeds or order in addition to turning on or off machine components.

Due to the global orientation of modern machine tool and laser manufacturers having customers and machine operators all over the world, the maintenance, error diagnosis, software update and, if necessary, repair of the delivered machine tools and lasers (summarized under the term "machines" below) is preferably available not only directly on site but also by remote access (teleservice). As of the filing of this application, no economical alternative to remote maintenance for machine tool and laser manufacturers is known. However, the operators of modern production plants are used to problems such as systems being disabled by computer viruses or Trojans. An increasing number of networks in industrial production plants can lead to an increase in the potentially dangerous problems associated with those networks. To address these problems, operators have taken steps such as to stop unsafe remote maintenance solutions and/or devise extensive safety requirements. However, this can have serious consequences for machine tool and laser manufacturers, particularly if many of their customers each devise their own custom safety standard for remote access, there will be many variants depending on the type of dial-in connection (modem, ISDN, Internet, GSM, UMTS) over various virtual private networks (VPN) standards for data connection to a range of compulsory virus scanners and firewalls.

In order to benefit from the possibilities of teleservice, a remote connection should be safe, reliable and free of disturbances. Previously connections were commonly established through direct dialing-in from a service computer via an analog modem or an ISDN connection, whereas more recently the demand for modern communication technology, the so-called VPN, has increased. A VPN is a computer network that uses a public communication network, for example the Internet, for transporting private data, in which the connection via the public network is normally encrypted. By means of encryption, a network connection is established, which can be accessed by matching addresses and passwords such that only authorized users can communicate with each other. VPN consequently can allow safe transmission via an unsafe network.

The Internet is also useful as a central medium for teleservice in the field of automation technology. Firewall and VPN systems help to render the use of the Internet safe. In addition to the considerably improved safety, IP (Internet Protocol)-based remote maintenance connections offer a substantially higher bandwidth than the conventional modem connection. The Internet offers broad-band transmission of a large amount of data, including transmission of video information, e.g., in case of distributed monitoring systems.

In some cases, companies extend their firewall gateways to VPN portals, through which the machine tool and laser manufacturers have remote access to delivered machine tools and lasers. In this connection, the machine tool and laser manufacturers are typically required to remove the local modems and ISDN accesses of their machine tools and lasers. In the meantime, some companies have started to define access defaults that are not standardized. In addition to VPN they also use other authentication methods such as e.g. Caller-ID, Preshared Keys, One Time Password or SecureID or special hardware.

Remote access via VPN can place great demands on the infrastructure and safety. The fact that remote access via VPN depends on the technology used by the machine operator is particularly problematic. Machine tool and laser manufacturers have not established a simple universal solution due, at least in part, to the fact that it has not been possible up to now to use different pieces of VPN client software (e.g., CISCO VPN Client and Checkpoint VPN Client) at the same time within, for example, one operating system or a service computer of a service member. Depending on the VPN solution used by the machine operator, a different VPN client, and therefore an independent computer, may be required. Corresponding problems result when the machine operator requires further access defaults and dialing-in technologies, e.g., remote access service via ISDN or via modem. Further problems result when sensitive (access) data of the machine operator is locally stored on service computers of service members. This data is only insufficiently protected against attacks from the Internet or in case a service computer is stolen.

The product life cycles of hardware components that are used in operating computers for controlling machines are generally considerably shorter than the product life cycles of the machines and the software that is used (e.g. machine operating software). The limited availability of hardware components generally results in a diversity of variants of the utilized operating computer hardware during the life cycle of a machine type. These different hardware variants should be taken into consideration and be supported by software when the machine operating software is updated. A hardware change generally also entails software changes (e.g., a change in one or more drivers). Consequently, the software developers should take great care to ensure that all hardware variants that are used are also software-supported. Major modifications are continually required, since certain drivers for new hardware are only supported in up-to-date operating systems. This generally requires an upgrade of the operating system. The dependencies of the different software components of a machine require repeated compulsory exchange of further components (e.g., NC kernel hardware and software) in case no compatible hardware is available when replacement parts are required. Additionally, modern encryption systems often only function with up-to-date operating systems and cannot typically be used with older operating systems such as Windows 3.11. Accordingly, in order to keep the security at the most recent level, a modern operating system should be installed on the operating computer.

SUMMARY

In certain aspects, the disclosure features an apparatus or system that can reduce (e.g., prevent) compatibility problems that may occur after hardware exchanges and/or can reduce occurrences of (e.g., prevent) communication software interfering with machine operating software in a machine control with a control computer of the above-mentioned type.

The parameters associated with the actuators of a machine (e.g., distance of a laser head to a metal to be machined, laser power, cutting gas pressure) can be set by the control computer. Also, sensor data, or error messages from sensors and actuators can be read out by the control computer for analysis of the process, to detect the need for items including, for example, maintenance, repair, or refilling of consumables.

The control computer can be connected to or a combined with a user interface (e.g., a display, touch screen, mouse and/or keyboard), which is also called a man-machine control (MMC) or human-machine interface (HMI). Also, the control computer can be connected to an intranet or internet. This connection can be employed for surveillance or servicing the machine remotely or for receiving manufacturing orders (in the form of computer aided design (CAD) or computer aided manufacturing (CAM) data) at the machine and sending out an order status. Surveillance, servicing the machine and receiving orders can also be done locally employing the HMI. This can be accomplished by viewing data provided by the NC or data input through the HMI. The control computer can CAD or CAM data and/or prepare an NC program based on CAD or CAM data.

In certain aspects, the disclosure features an apparatus which includes a control computer for controlling a machine, in which the control computer has at least one virtual computer on which at least one application is configured to execute. The application can include a machine operating software application, an Internet connection application and an Internet encryption application.

In some implementations, the control computer includes several virtual computers on which the same or different applications are executed. For example, a machine operating software application can be operated on a first virtual computer whereas an Internet connection and Internet encryption application can be operated on a second virtual computer. Each of the virtual computers can run different operating systems.

Virtual computers, also known as virtual machines ("VMs"), can be operated in an isolated environment under the control of a virtualization program. Examples of virtualization programs include but are not limited to VMware® Server™, VMware® Workstation, Microsoft® Virtual Server and Microsoft® Virtual PC. Virtualization allows several virtual computers with heterogeneous operating systems to run in an isolated fashion and also at the same time on the same physical machine. Each virtual computer can include its own virtual hardware set such as, e.g., random access memory, a central processing unit, network interface controller, onto which the operating system and the applications can be loaded or with which the operating system and applications can interact. The real physical computer on which the virtual computers are run is called host computer. A virtual computer is called a guest and the operating system associated with the virtual computer is called guest operating system.

A virtual computer functions similar to a physical computer. That is to say, the guest operating system and applications on a virtual computer perform in a similar manner as they would on a physical computer and users do not experience any substantial differences operating a virtual computer in comparison with operating a physical computer. In addition, a virtual computer can also act as a full-value computer with its own Internet protocol and media access control addresses within a local area network (LAN). Virtual computers can be completely isolated from the host computer and other virtual computers. Virtual computers can communicate with each other in the same way as separate computers communicate, e.g., via network connections. In case of failure of one virtual computer, the other virtual computers and the host computer remain unaffected. Data from a failed virtual computer cannot escape to other virtual computers and applications can be configured to communicate with each other only via configured network connections. The mutual separation of the virtual computers with respect to each other and with respect to the host computer permits different operating systems to be run parallel and independently of each other on the same hardware.

When the virtual computer has been set up, the virtual hard disk is still empty. At first, an operating system should be installed like on a physical computer. The virtual computer boots the guest operating system from the physical installation CD or from an ISO image. The setup routine installs the guest operating system and copies system files to the virtual hard disk ignorant of the fact that the latter corresponds to a file on the hard disk of the host computer. Hardware recognition recognizes all emulated devices as if they were real. The required service packs and patches as well as tools and the required application software are subsequently installed on the guest.

In order to prevent compatibility problems of the control computer after a necessary hardware exchange, the machine operating software is operated on a virtual computer. Expensive adjustments and changes of the machine operating software are not required since the machine operating software continues to run on its old operating system. The dependencies of the machine operating software on the hardware generations during the product life time of the machine are controllable by using virtualized hardware. The software (e.g., machine operating software) is installed and operated within one virtualized computer. The operating system of the host computer (master operating system) on the physical hardware is only used to provide the virtual hardware environments. In case of replacement, almost any hardware can be used on which the virtual environment can be used such that it runs. Adjustment of the software application (e.g., man-machine control) that is operated within the virtual environment is not required since the runtime environment (operating system, storage, number of processors, infrastructure such as, e.g., network cards or graphic board) does not change from the point of view of the software application operating on the virtual computer. The costs can also be reduced by parallel operation of several virtual environments on physically existing hardware.

Furthermore, various applications such as, e.g., machine operating software as well as Internet connection applications and encryption applications can be run using separate virtual computers. The use of virtual computers or virtualized hardware with an independent operating system can eliminate mutual dependencies and side effects (negative effects). Instead of encrypting the Internet connection of the control computer via a separate box, which was common practice up to now, the entire communication connection is not realized within the main operating system of the control computer but within virtualized hardware with an independent operating system.

In another aspect, the disclosure relates to a system for remote communication between a service computer or service portal and the above-described control computer of a machine. The remote communication system includes a central computer that is protected by a firewall and has several virtual computers and a database that contains data (e.g., dial-in technology, passwords, settings and software for VPN connections) about the customer and the machine. Several virtual computers can be installed on the central computer, each of which can include a different operating system and application software (such as anti-virus programs). One specifically configured virtual computer can be configured for each customer and each machine control, through which a connection between the central computer and the machine control is established. The central computer identifies the associated connection and the associated virtual computer using the data stored in the database, and establishes the connection to the machine control through a network connection such as the Internet. The service computer is not directly connected to the machine but is connected through the protected central computer. The connection between the service computer and the central computer and the connection between the central computer and the machine control can be established via the Internet, and in some cases via a secure VPN connection.

The details of one or more embodiments are set forth in the accompanying drawings and the description below. Other features and advantages will be apparent from the description and drawings, and from the claims. The features mentioned above and the features set forth hereinafter may also be used individually or in any desired combination. The embodiments shown and described are not to be understood as forming a definitive list, but rather are of the nature of examples for illustrating the invention.

DETAILED DESCRIPTION

Figure 1:
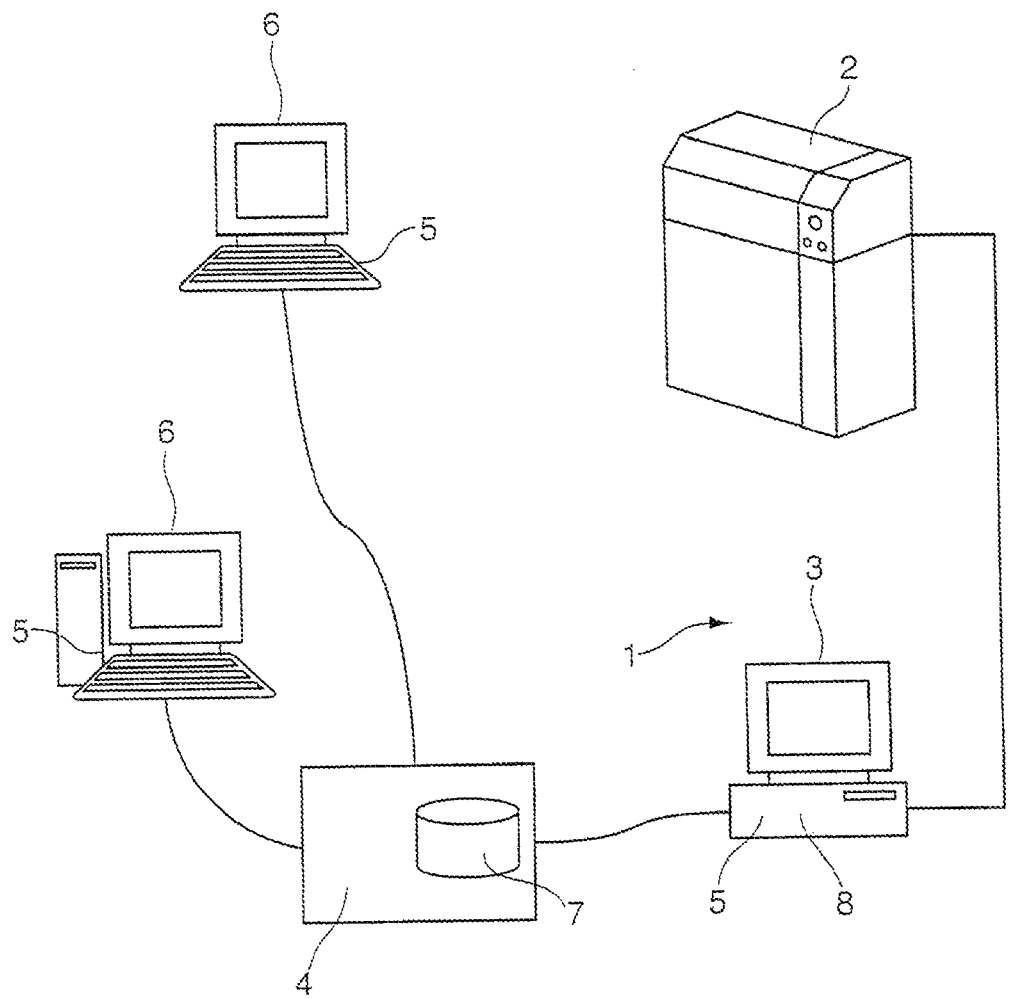
FIG. 1 shows an example of an apparatus for controlling a machine.

FIG. 1 shows an apparatus 1 for controlling a machine 2, in which the apparatus 1 includes a control computer which is designed as an operating computer 3 and which is connected to the machine 2 and to a server 4. Machine operating software, software that provides remote access to the machine 2, including for example, PC-Anywhere, and, if necessary, further applications are installed in a memory device of the operating computer 3. Examples of memory devices and other computer readable media on which applications or other software can be stored include, but are not limited to, semiconductor memory devices, e.g., EPROM, EEPROM, and flash memory devices; magnetic disks, e.g., internal hard disks or removable disks; magneto optical disks; and CD ROM and DVD-ROM disks.

The operating computer 3 also can include a processor configured to execute a programming system 5, such as CAD or CAM software, stored in a memory device of the computer 3. A processor can include, by way of example, a general and/or special purpose microprocessor, and any one or more processors of any kind of digital computer. The programming system 5 can create or compile programs such as NC programs for production orders. The programming system 5 can be installed in the memory of the operating computer 3 of the machine 2 or in the memory of one or more computers 6 (e.g., a notebook computer, a personal computer) in a communication network. Examples of communication networks include a LAN and a wide area network (WAN), e.g., the Internet.

The NC program can be stored in a database 7 on the server 4. A user operating the machine 2 can access the database 7 of the server 4 and communicate with the NC program directly from the operating computer 3 through the communication network. The data transfer of the NC program can also be accomplished via a storage medium including, for example, a disk, CD-ROM or a universal serial bus (USB) stick. The programming system 5 executes the strategies selected by the programmer. For example, the programming system 5 determines the processing order, sets puncture points, and includes instructions to round sharp corners and supplement small loopings during laser manufacturing.

In order to obtain an appropriate processing quality, the NC program of the apparatus 1 can specify suitable values for the processing parameters such as, e.g., laser power and advance speed. These values can be stored in technology tables 8 contained on a memory device of the operating computer 3.

Technology tables 8 are repositories that contain process-reliable values for processing parameters. They can be generated by the NC program for each material type and material thickness to be machined by the machine 2. The NC program can take into consideration the laser type, the contour size and the optical focal length to be used during machining when generating the process-reliable values. Each technology table 8 is allocated one number and can be stored in the apparatus 1, e.g., on the operating computer 3. The technology table 8 can be centrally maintained and updated and is available for any production order. The NC program does not contain any values for the processing parameters but does include the number of the technology tables 8 in which the process-reliable values are stored. The machine control 1 accesses the technology table 8 during processing. The machine control 1 can process the content of the NC program, calculate the movements of machine axes associated with the machine 2 (e.g., axes associate with the laser or work-piece holder) and regulate the laser power and the gas supply to the machine 2.

Figure 2:
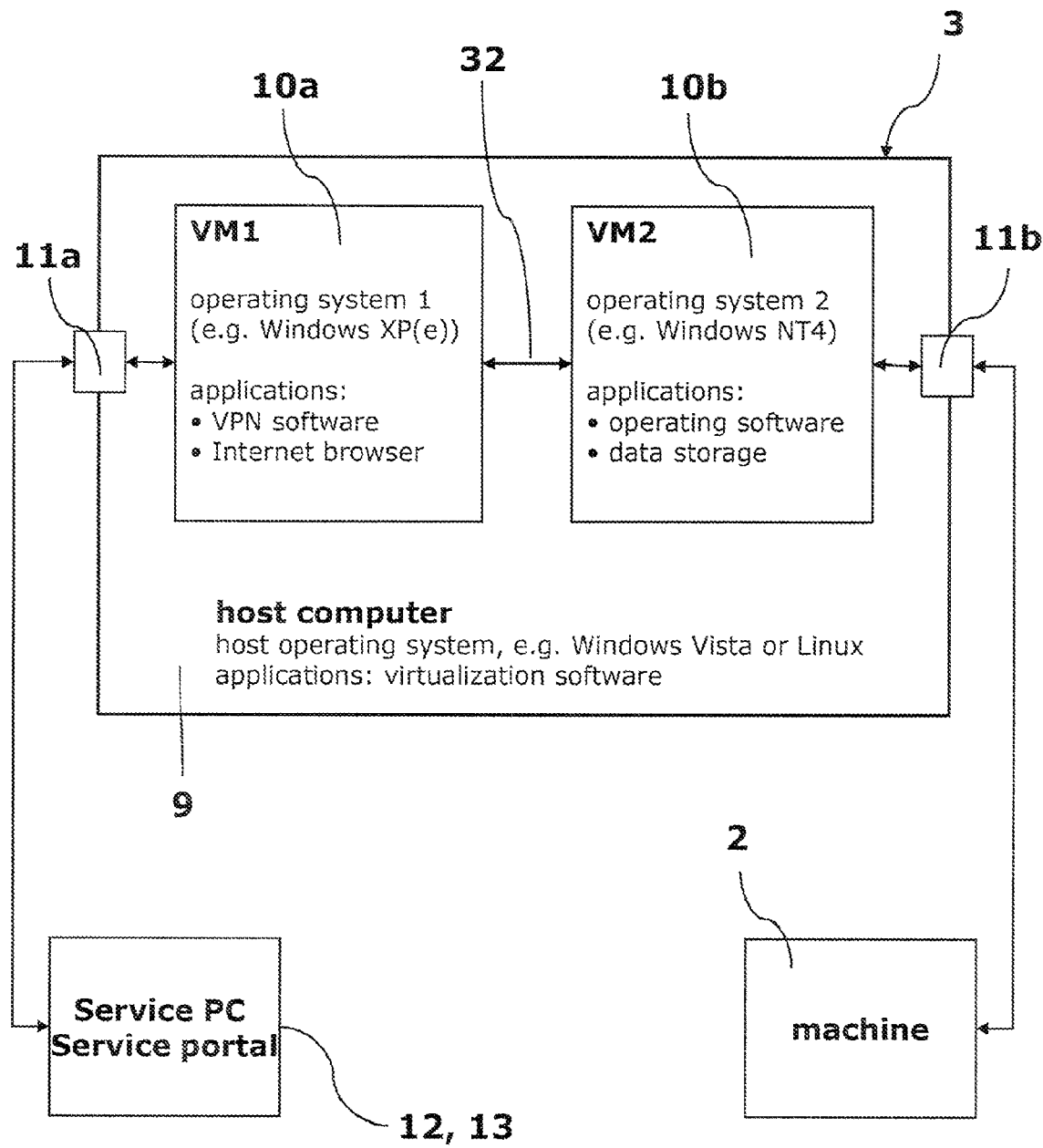
FIG. 2 shows an example of an operating computer for controlling a machine.

FIG. 2 shows an example of the operating computer 3 for the machine 2 (e.g., a machine tool or laser), on which the machine operating software and, if necessary, further application software are operated. The operating computer 3 is designed as a host computer 9 with two virtual computers 10a, 10b and has a first physical or virtualized network gateway or network card 11a for connection to a service computer 12 or a service portal 13 and a second physical or virtualized network gateway or network card 11b for connection to the machine 2.

The virtual computers 10a, 10b run in an isolated environment on the operating computer 3 under the control of virtualization software that is installed/stored in the memory of the host computer 9. The host computer 9 is operated with a host operating system (e.g., Windows Vista® or Linux). One virtual computer 10a, designated by VM1 in FIG. 2, is operated with a first operating system, e.g., Windows XP®, and applications that concern the communication connection of the host computer 9 are stored on this computer. Applications related to communication can include, for example, an Internet browser that enables connection with the Internet or Internet encryption software (e.g., VPN Software). The other virtual computer, designated by VM2 in FIG. 2, can be operated with a second operating system, e.g., Windows NT4.0®. In addition, the machine operating software can be installed on this virtual computer. The virtual machine 10b also has data storage, e.g., for storing the technology tables 8 and data about existing tools of the machine. The programming system 5 for creating NC programs can also be designed as a virtual computer.

In case one hardware component of the operating computer 3 is exchanged with another non-compatible hardware component, a backup file of the virtual computer 10b can be generated. The backup file of the virtual computer 10b can be stored on the server 4 of the communication network or on a storage medium such as a disk, CD-ROM or a USB stick. When the hardware component has been exchanged, the host operating system (which may be the same as or different from a previously installed host operating system), is installed. Subsequently, the virtualization software then is installed on the host computer 9. When the virtual computer 10b has been set up via the virtualization software, the guest operating system and the application software (e.g., machine operating software) can be copied to the virtual computer 10b using the backup file. Renewed installation of the guest operating system and the application system is not required.

Figure 3:
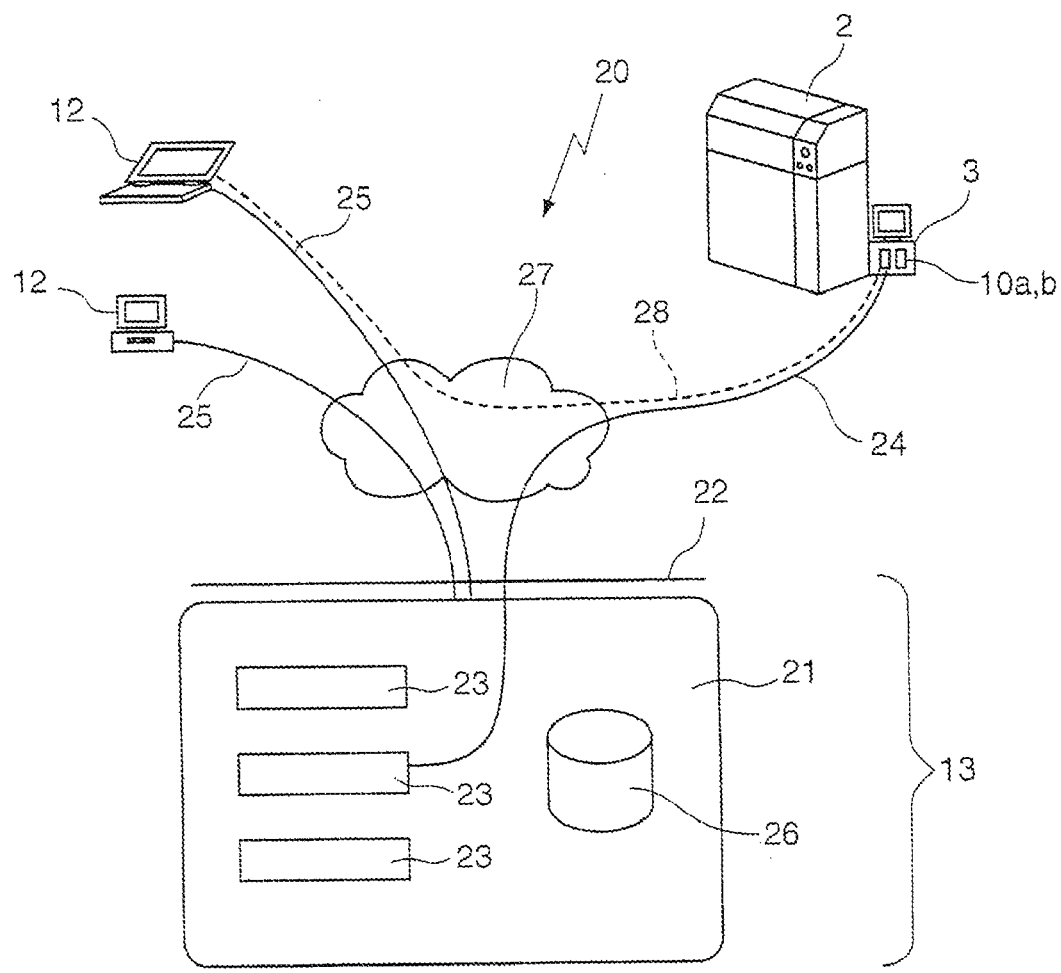
FIG. 3 shows an example of a remote communication system between the operating computer of FIG. 2 and a service computer or service portal.

The system 20 shown in FIG. 3 is used for remotely communicating between the operating computer 3, constructed as described above, of the machine 2 and a service computer 12 or a service portal 13 to allow maintenance, error diagnosis, software update and, if necessary, repair of the machine 2 by remote access.

The system 20 includes at least one central computer 21 that is protected from the outside by a firewall 22, and several virtual computers 23 that can be run parallel to each other. Each individual virtual computer 23 is designed for the same or different types of connection 24 with operating computers 3, which is described in more detail below. The service computer 12 is connected to the central computer 21 via a connection 25, which permits, in some implementations, only transmission of pixel information, mouse and keyboard movements. The central computer 21 is connected to the operating computer 3 of the machine 2 through one of the virtual computers 23 that is configured to connect to machine 2 through connection 24. The allocation of one or more machines 2 and their operating computers 3 to their respective connections 24 is stored in a database 26 of the central computer 21. The virtual computers 23 of the central computer 21 have different operating systems on which different application programs run. The different application programs can establish the connection 24 between the central computer 21 and different operating computers 3. The operating computer 3 has several virtual computers 10a, 10b which can communicate with each other via a virtualized network connection 32 or a virtual network card. Applications that concern the connection between the operating computer 3 and the outside world, such as the Internet connection and encryption, are installed on the virtual computer 10a. The connection 25 between the service computer 12 and the central computer 21 and the connection 24 between the central computer 21 and the respective operating computer 3 are each implemented via a communication network 27 including, for example, the Internet, using a VPN connection. The central computer 21 including Firewall 22 forms the service portal 13.

In order to establish remote access to the operating computer 3 of the machine 2, a service member initially establishes the connection 25 between his/her service computer 12 and the central computer 21 that is protected by the firewall 22. The service member authorizes himself/herself on the central computer 21 and selects the respective customer (i.e., the owner of the machine) and the machine 2. All individual defaults (passwords) of the customer are centrally stored in the database 26. The central computer 21 determines the connection 24 associated with the machine 2 on the basis of the data stored in the database 26, and selects that virtual computer 23 that is designed for this connection 24 to be connected to the operating computer 3, and starts this virtual computer 23. The service member carries out functions of the operating computer 3 and/or exchanges files between the operating computer 3 and the central computer 21 via the connection 24. Instead of directly connecting to the service computer 12, the operating computer 3 of a machine 2 located at the customer's place is connected to the service computer 21 through the protected central computer 21. The remote communication system 20 allows several service members to establish simultaneous connection between their service computers 12 and the operating computer 3 of the machine 2 via the central computer 21. Accordingly, service members or experts (i.e., a customer service agent or developer) at different locations can be connected to the operating computer 3 via the central computer 21.

For safety reasons, a service member can gain remote access to the machine 2 with the consent of the machine operator. For this purpose, a corresponding application is installed on the operating computer 3, which can be initiated by the machine operator. The central computer 21 makes an inquiry to the machine control and waits for the machine operator to release the machine 2 for remote access. In an alternative fashion, the service member can contact the machine operator via telephone to gain access. When the machine operator has enabled remote access to the machine 2, the central computer 21 initially provides the connection 24 to the virtual computer 10a. The virtual computers 10a, 10b, and the host computer 9 are connected to each other via the virtualized network connection 32. The service member can access the host computer 9 and the virtual computer 10b via the virtual computer 10a that acts as a router. The service member controls the operating computer 3 and/or exchanges files between the operating computer 3 and the central computer 21 via the connection 24. The service member can, e.g., update the machine operating software and/or the technology tables 8 on the virtual computer 10b. The operating computer 3 of a machine 2 located at a customer's place is not directly connected to the service computer 12. Instead, the operating computer 3 is connected via the protected central computer 21.

As indicated in FIG. 3 with dashed lines, a direct connection 28 between the operating computer 3 and the service computer 12 is also possible via the communication network 27, e.g., the Internet, in which this direct connection 28 can then be protected by corresponding security systems.

Figure 4:
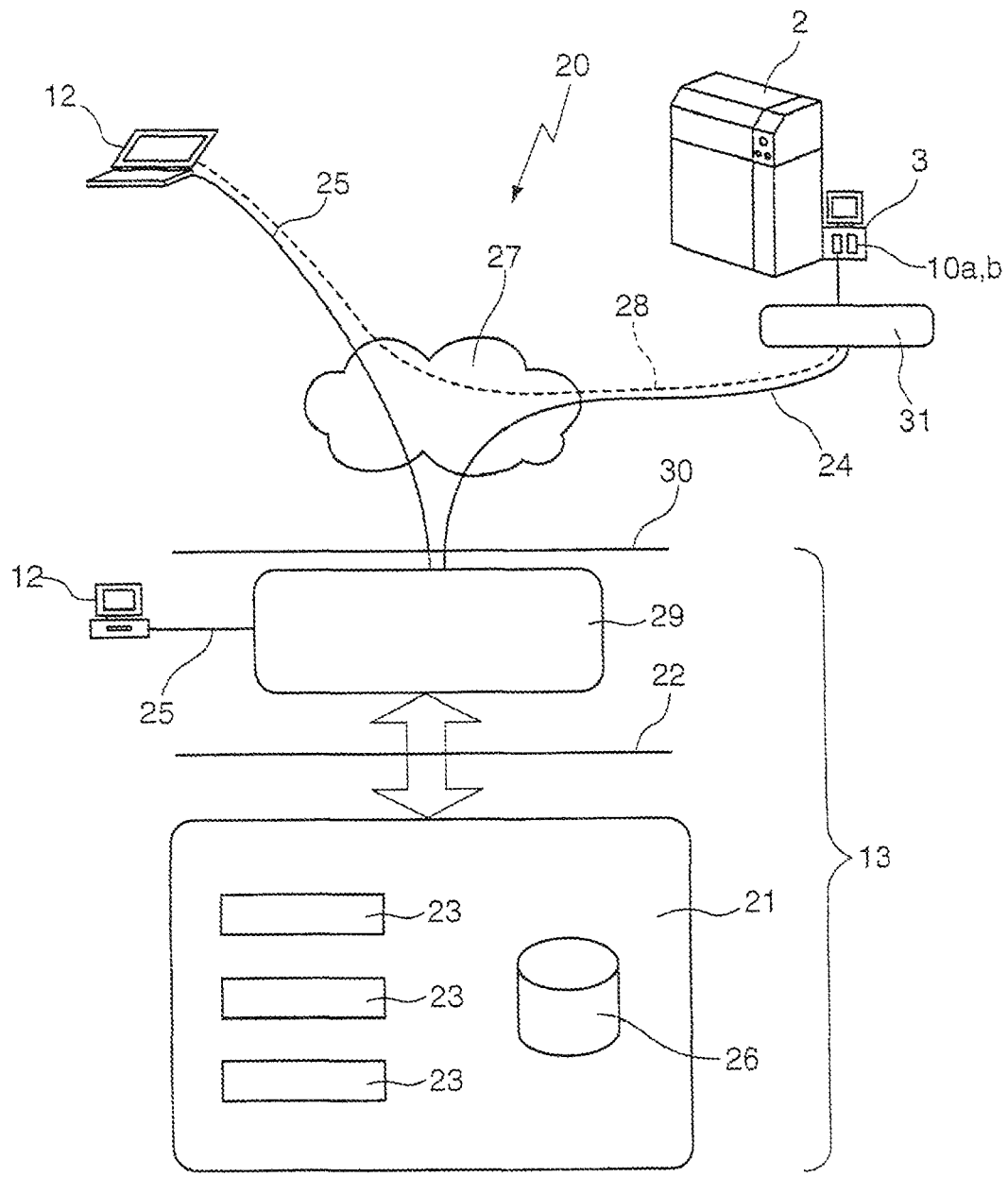
FIG. 4 shows an example of a remote communication system between the operating computer of FIG. 2 and a service computer or service portal.

In FIG. 4, the central computer 21 is connected to a communication network 29, e.g., an Intranet or other internal network of the machine manufacturer, via the firewall 22. The Intranet is connected to the Internet 27 via a further firewall 30. Moreover, the operating computer 3 is connected to another communication network 31, e.g., an Intranet or other internal network of the machine operator, which is also connected to the Internet 27. The central computer 21 is a protected LAN (VLAN) which is separated from the communication network 29 of the machine manufacturer via the firewall 22. Only certain persons have access to the structure behind the firewall 22. The service computer 12 is connected to the central computer 21 either directly via the communication network 29 of the machine manufacturer or via the Internet 27. As indicated in FIG. 4 with dashed lines, in this case, a direct connection 28 between the operating computer 3 and the service computer 12 is also possible 28 via the Internet 27, in which this direct connection 28 can then be protected by corresponding security systems.

Embodiments of the subject matter and the functional operations described in this specification can be implemented in a data processing apparatus, digital electronic circuitry, or in computer software, firmware, or hardware, including the structures disclosed in this specification and their structural equivalents, or in combinations of one or more of them.

The term "data processing apparatus" encompasses all apparatus, devices, and machines for processing data, including by way of example a programmable processor, a computer, or multiple processors or computers. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer and/or a data processing apparatus are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites. The computers and other components of the system can be interconnected by any form or medium of digital data communication, e.g., a communication network. Examples of communication networks include a LAN and a WAN, e.g., the Internet.

Other embodiments are within the scope of the following claims.

What is claimed is:

1. An apparatus for controlling a machine tool or a laser machine, the apparatus comprising:
    a machine-sided control computer configured to operate the machine tool or the laser machine;
    wherein the machine-sided control computer includes computer readable media on which a first virtual computer and a second virtual computer are stored,
    wherein the first and second virtual computers are connected to each other through a virtual network connection;
    wherein the first virtual computer operates using a first operating system and the first virtual computer is configured to establish a connection to a communication network and/or encrypt communication over the communication network, and the second virtual computer operates with a second operating system and is configured to control the machine tool or the laser machine.

2. The apparatus according to claim 1, wherein the first virtual computer is operable to connect to a service computer or a service portal using a virtualized network gateway.

3. The apparatus according to claim 1, wherein the second virtual computer is connected to the machine using a virtualized network gateway.

4. The apparatus according to claim 1, wherein the first virtual computer has a different operating system from the second virtual computer.

5. The apparatus according to claim 1, wherein the control computer is separate from the machine.

6. A system for remote communication comprising:
    a service computer or a service portal;
    a machine-sided control computer configured to operate a machine tool or a laser machine, wherein the machine-sided control computer includes computer readable media on which a first virtual computer and a second virtual computer are stored,
    wherein the first and second virtual computers are connected to each other through a virtual network connection;
    wherein the first virtual computer operates using a first operating system and is configured to establish a connection to a communication network and/or encrypt communication over the communication network, and the second virtual computer operates using a second operating system different from the first operating system and is configured to control the machine tool or the laser machine; and
    a communication network between the service computer or the service portal and the machine-sided control computer, wherein the machine-sided control computer is configured to connect to the service computer or service portal using the communication network.

7. The system according to claim 6, further comprising:
    a central computer including computer readable media on which a plurality of virtual computers are stored, wherein the service computer or service portal is connected to the machine-sided control computer through the central computer, wherein each of the virtual computers on the central computer is configured to run in parallel on the central computer, and wherein one of the virtual computers on the central computer is configured to establish a connection over the communication network between the central computer and the machine-sided control computer.

8. The system according to claim 6, wherein the service computer or the service portal is connected directly to the machine-sided control computer through the communication network.

9. The system according to claim 6, wherein the central computer is directly connected to the machine-sided control computer.

10. The apparatus according to claim 1, wherein the machine operating computer program is configured to control sensors and/or actuators in the machine tool or the laser machine.

11. The system according to claim 6, further comprising a machine connected to the machine-sided control computer, wherein the machine operating computer program is configured to control sensors and/or actuators in the machine tool or the laser machine.

* * * * *